Patented Sept. 22, 1953

2,653,103

UNITED STATES PATENT OFFICE 2,653,103

QUICK-COOKING HOMINY AND METHOD OF MAKING SAME

Charles R. Carman, Park Forest, and Jim E. Allison, Elmhurst, Ill., assignors to Guardite Corporation, a corporation of Delaware No Drawing. Application June 12, 1953, Serial No. 361,423

5 Claims. (Cl. 99—82)

This invention relates to a pre-cooked cereal and a method of preparing the same and particularly to a pre-cooked hominy.

This application is a continuation-in-part of our copending application, Serial No. 190,666, filed October 17, 1950, now abandoned, which in turn was a continuation-in-part of our then copending application, Serial No. 161,744, filed May 12, 1950, now abandoned.

The pre-cooking of cereal is not a new art, but the problem of pre-cooking cereals, drying them, and then having them reconstitute rapidly in water, without loss of flavor, palatability, or granular identity has heretofore not been satisfactorily solved.

The formation of the present hominy product involves the following factors:

1. In order to procure a uniform hominy product, the moisture content of the material should be uniform as between the hominy grits and uniform throughout each grit. Depending upon the type of hominy employed, the moisture range will vary and the uniformity may be obtained as desired.

2. The hominy should be cooked by steam or otherwise under conditions which establish a proper moisture content and cause the starch to become uniformly gelatinized so as to bring the hominy to a sufficient state of plasticity properly to expand. The conditions should be adjusted so that each hominy grit should be cooked to substantially the same degree and in addition these conditions are preferably of such a nature that the non-condensable gases in the grits are removed therefrom. This may be established under vacuum conditions under which the contained moisture boils and washes out the non-condensable gases in the grits. During the cooking a bleed or purge line is maintained so that any non-condensable gases generated during the cooking or supplied with the cooking may be eliminated.

3. When the hominy is properly cooked and is at the proper moisture content, it is suddenly shot into a vacuum zone, causing expansion of the hominy. The conditions of the resulting explosion should be such as to cause cold setting of the hominy. The temperature is determined by the vacuum conditions into which the hominy is fired and the ability to maintain these conditions during the resulting explosion and concomitant expansion of the hominy. This means that with commercially practicable vacuum equipment the expansion chamber should have a volume enormously greater than the cooking chamber. In actual practice, this has been of the order of 330 to 1 in volume, using vacuum equipment having the capacity of pulling a vacuum of 0.2 inch of mercury absolute from atmospheric conditions in a period of about 15 minutes. The preferred vacuum at the start of the expansion of the hominy is of the order of 0.1 to 0.2 inch of mercury absolute. In such apparatus the pressure may ride up somewhat during the explosion step. It is preferred to continue evacuation of the expansion chamber during the explosion and to maintain it at as low a pressure as is practicable. The temperature to which the hominy product is cooled is normally determined by the vaccum condition during the explosion step.

4. The starch is substantially completely gelatinized.

5. The time-temperature relationships are sufficiently short and low respectively, that browning or scorching is avoided.

6. The hominy must not be so much cooked as to change the cell walls so as to render them impervious to steam, since otherwise they would rupture on expansion.

7. The moisture content, and cooking time, temperature and pressure, and the vacuum into which the hominy is fired are selected to produce a hominy product which has a volume from 2½ to 5½ times the original hominy grits as determined by their cup weights. Put conversely, the specific gravity as determined by cup weights is from 18.2% to 40% the specific gravity of the original hominy grits.

Removal of the non-condensable gases from the hominy, cooking, and vacuum expansion are preferably carried out in a puffer of the type disclosed in the Doyle Patent No. 2,627,221, issued February 3, 1953. In such an apparatus a steaming chamber is provided within which the hominy may be placed. This steaming chamber is connected by a triggered door to an expansion chamber. The expansion chamber is preferably kept at a low pressure, means being provided to maintain a low pressure during the expansion. The steaming chamber is provided with an evacuating means, steaming means, and usually with a purge or bleed line through which non-condensable gases can be eliminated as well as some condensed steam which develops during steaming.

The steps of removing the non-condensable gases from the hominy in cooking may be carried out before introduction into the puffer, but convenience is best served by carrying out the operation in one device.

In accordance with the present invention, regular hominy, ground to 14-24 measurement, was employed. Such a material, prior to precooking, is now available on the market. Its normal cooking time is about thirty minutes.

The material, prior to treatment, had a cup weight of approximately 169 grams.

The material was processed in forty pound lots, without any moistening or tempering operation. Tempering may be employed, but it has not been found to improve the material and, in some cases, has a deleterious effect.

Hominy is placed in the steaming chamber, and evacuation carried out to approximately 0.2 inch of mercury absolute for about two minutes, the hominy being at a temperature of at least about 40° F. to remove the non-condensable gases from the grits. Steam was then introduced to the steaming chamber accompanied by continued purging to cook the hominy and remove any condensate and non-condensable gases. The product is cooked sufficiently to gelatinize the starch, inactivate enzymes and supply sufficient plasticity for vacuum expanding. The amount of cooking required will vary considerably with the characteristics of the grits, but may readily be determined by a preliminary test for any particular lot.

The preferred cooking or steaming cycle is to introduce steam to reach fifty pounds per square inch gauge in about fifty-five seconds, after which the material is expanded by opening the triggered door to the expansion chamber, which was at a pressure of about 0.2 inch of mercury absolute. Normally, the pressure in the expansion chamber is not permitted to rise above about two inches of mercury absolute until cold setting of the vacuum expanded hominy occurs. In some instances, however, we have operated successfully with the pressure in the expansion chamber riding up as high as 3½ to 7 inches of mercury absolute as measured on a standard mercury manometer, but in most instances the pressure was reduced below two inches of mercury absolute within a few minutes and before reimposition of atmospheric pressure.

In one specific example, the steaming cycle was sixty pounds per square inch gauge of steam reached in fifty-five seconds. In another, it was seventy-five pounds per square inch gauge of pressure reached in seventy-seven seconds. In another, it was fifty-five pounds per square inch gauge of steam pressure reached in forty-six seconds. In another, it was sixty-five pounds per square inch gauge of steam pressure reached in forty-seven seconds. In another, it was twenty-five pounds per square inch gauge steam pressure reached in forty seconds. In another it was thirty-five pounds per square inch gauge pressure in about forty seconds.

After expanding, the product was dried by the introduction of superheated steam at about one inch of mercury absolute into the expansion chamber and continuing this operation for about five minutes. That is, steam was continuously admitted while the evacuating apparatus was operated so that the pressure did not rise above one inch of mercury absolute. It is preferred to have a moisture content of approximately 10-15% in the product before further processing.

The expanded and dried hominy was then granulated on corrugated rolls. These corrugations broke up clusters and removed some loose starch from the grits.

The vacuum expanded hominy product has a volume from 2½ to 5½ times the original hominy grits. Put conversely, the specific gravity as determined by cup weight is from about 18.2% to 40% the specific gravity of the original hominy grits. It is granular in appearance having a snowy-white interior on cross-section and substantially the shape of the original grits. It is capable of remarkably fast water absorption and can be cooked in approximately thirty to sixty seconds as compared to thirty minutes required for the original material.

In cooking, one cup of the processed hominy is slowly stirred into two and one-quarter cups of water containing a half teaspoon salt. The boiling is carried out for thirty seconds, after which the material is ready for serving. More or less water may be added to suit individual tastes.

The cooking operation in the steaming chamber increases the moisture content of the hominy approximately 1% for each twenty to twenty-five degrees F. increase in temperature. This increase is lost on vacuum expanding, and the loss of water, plus the sudden cooling is believed to cause setting of the plasticity of the walls so that they will not collapse upon subsequent increase in pressure.

The starchy portions of the processed material are translucent. The surfaces have a somewhat vitreous appearance and the bundle of starch cells somewhat resembles a snowball.

The foregoing detailed description is given for clearness of understanding only, and no unnecessary limitations should be understood therefrom, as modifications will be obvious to those skilled in the art.

We claim:

1. The method of treating hominy which comprises substantially removing the air from the hominy and substituting an atmosphere of steam under pressure; adding steam thereto at increased pressure and temperature to raise the moisture content thereof and cook the hominy; then instantaneously reducing the pressure from at least about 25 pounds per square inch gauge to well below atmospheric pressure to cause an explosion resulting in expansion of the hominy; and maintaining a reduced pressure sufficient to cold set the expanded hominy material during the explosion and until cold setting of the hominy occurs, the pressure at the inception of the explosion and the extent of pressure reduction being correlated to produce an expanded product having a specific gravity between about 18.2% and 40% of the original hominy grits.

2. The method as set forth in claim 1, in which the steam operation is carried on to reach a pressure of from about 25 pounds to 75 pounds per square inch gauge.

3. The method as set forth in claim 1, in which the instantaneous pressure reduction is to 2 inches of mercury absolute or less.

4. The method as set forth in claim 1, in which the final moisture content of the expanded hominy product prior to reimposition of atmospheric pressure is from 10% to 15%.

5. A cold set vacuum expanded quick-cooking hominy product produced by the process of claim 1.

CHARLES R. CARMAN.
JIM E. ALLISON.

(References on following page)

References Cited in the file of this patent

UNITED STATES PATENTS

| Number | Name | Date |
|---|---|---|
| 341,355 | Solter | May 4, 1886 |
| 563,859 | Hopkins | July 14, 1896 |
| 1,933,158 | Bohn et al. | Oct. 31, 1933 |
| 2,261,456 | Warren | Nov. 4, 1941 |
| 2,287,737 | Huzenlaub | June 23, 1942 |
| 2,295,868 | Schwebe | Sept. 15, 1942 |
| 2,358,251 | Huzenlaub | Sept. 12, 1944 |
| 2,552,291 | Rupp | May 8, 1951 |

FOREIGN PATENTS

| Number | Country | Date |
|---|---|---|
| 18,949 | Great Britain | of 1912 |
| 514,102 | Great Britain | Oct. 31, 1939 |